UNITED STATES PATENT OFFICE.

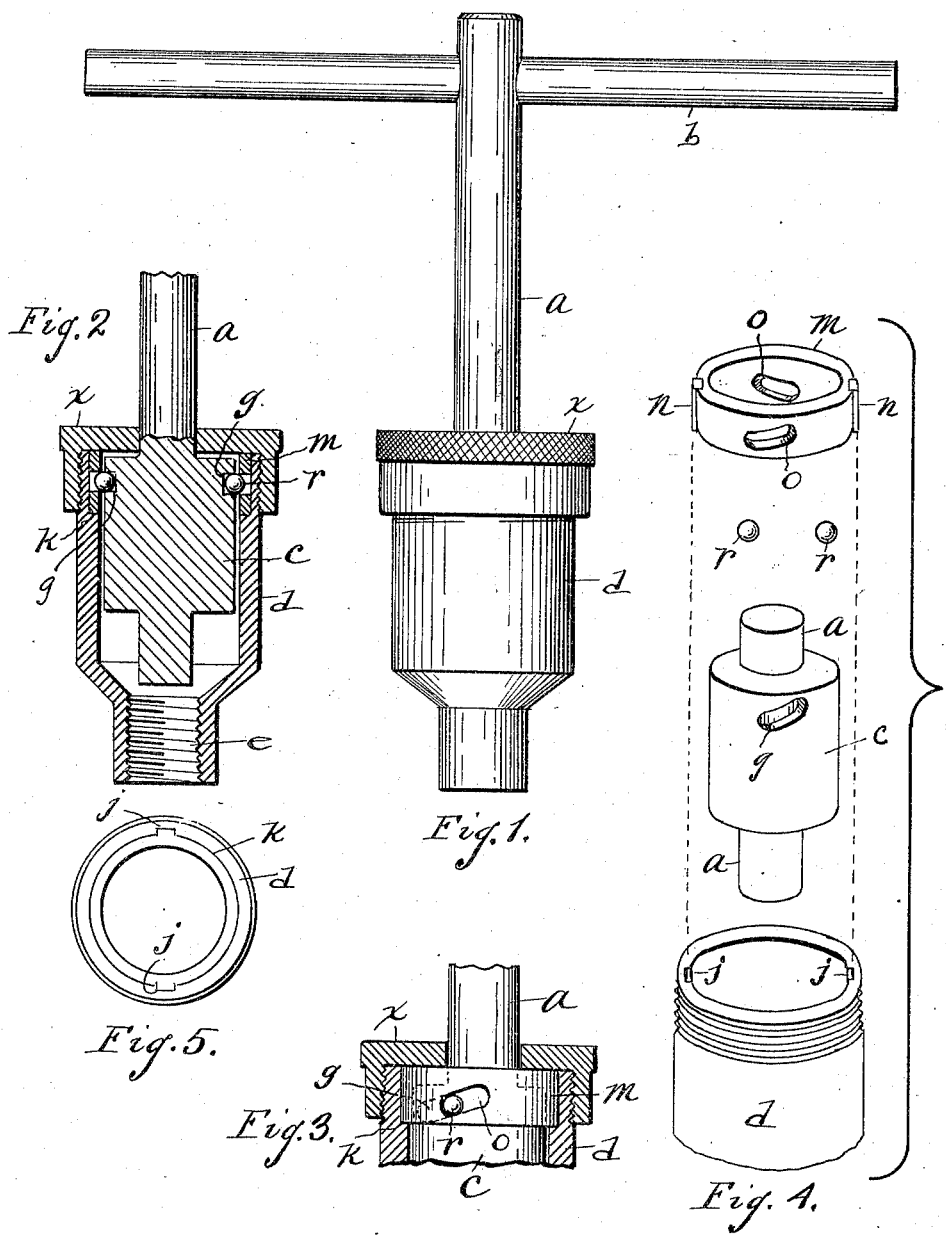

FRANK M. FUNK, OF DETROIT, MICHIGAN.

STUD-DRIVER.

1,308,490.  Specification of Letters Patent.  Patented July 1, 1919.

Application filed January 29, 1919. Serial No. 273,734.

*To all whom it may concern:*

Be it known that I, FRANK M. FUNK, a citizen of the United States, residing at Detroit, county of Wayne, State of Michigan, have invented a new and useful Improvement in Stud-Drivers, of which the following is a specification.

This invention relates to a stud driver, and has for its object a tool for driving studs that have no heads, in which the tool takes hold by running on the threads of the stud. Tools of this character to be effective must have some way to release the driver from the stud, otherwise the stud is liable to turn out of its hole when the driver is turned in an effort to release it from the stud. Avoidance of this is usually accomplished by providing a lost motion driving connection between the driver and the stud and also providing cam devices to lift the stem of the driver out of binding contact with the end of the stud.

In function and mode of operation the stud driver hereinafter described is not new, but in the means provided for accomplishing the function it is thought to be new and is considered to be a marked improvement over stud drivers heretofore existing in strength and cheapness of manufacture. Further, a driver with interchangeable sockets is afforded. This will more fully appear in the specification following.

In the drawings,—

Figure 1 is an elevation of the stud driver.

Fig. 2 is a longitudinal section of the main portion of the driver.

Fig. 3 is a fragmentary view of the same part taken at a 90 degree angle from that shown in Fig. 2.

Fig. 4 is a perspective view showing how the parts are assembled.

Fig. 5 is a plan view of the sleeve.

$a$ designates the stem provided with a bar $b$ by which it may be turned. $c$ is an enlargement of the stem adapted to fit into the sleeve $d$. This sleeve $d$ has a reduced outer end internally screw-threaded at $e$ to engage on the threads of the stud. The enlarged portion $c$ of the stem has a pair of oblique recesses $g$. The interior of the sleeve $d$ is provided with key-ways $j$ and a ring seat $k$ to receive the ring $m$ provided with keys $n$. The ring $m$ has a pair of oblique slots $o$ cut through the same. The slots of the ring and stem lap in pairs and each pair is adapted to take a ball $r$. This ball acts as a driving connection between the ring and stem.

In turning the driver upon the stud the turning effort is communicated through the stem $a$, the enlargement $c$, and the ring $m$ to the sleeve $d$, but, as shown in Fig. 3, the stem travels longitudinally outward with respect to the sleeve before the elevated end of the slot $g$ jams the ball $r$ against the lower end of the slot $o$. At this stage all the lost motion is taken up and the stem and the sleeve turn together as a unit until finally the end of the stem jams down against the head of the stud. Thereupon the stem, sleeve and stud turn as a unit until the stud is driven into its hole as far as desired. Then the turning movement of the stem $a$ is reversed. The lower end of the slot $g$ can move a considerable distance before it picks up the ball $r$ and jams it against the upper end of the slot $o$, so the stem and sleeve will turn together. But in traveling this distance the stem has risen with respect to the sleeve for the ball engaging in the slot $o$ of the ring $m$ that is held from rising by the cap $x$ compels the stem to rise when turned counter-clockwise. This releases the end of the stem $a$ from the end of the stud, and hence there is very little danger of turning the stud out of its hole when the sleeve $d$ rotates in an endeavor to disengage itself from the threads of the stud.

This construction is a marked improvement over the form in quite common use, which consists of a pair of oblique slots in the sleeve and a pin driven through the enlarged portion of the stem and having its ends engaging in the two oblique slots. This form of construction is not interchangeable, that is to say, the sleeves cannot be taken off the stem and replaced with sufficient facility so that a stem can be provided with a set of sleeves to fit different sized studs. The construction here shown can be cheaply made as compared with other constructions, which have in view interchangeable sleeves.

It is not necessary to cut an oblique slot in both the stem and the ring, but one oblique slot and a circular recess to contain the ball will operate the same way but will not cause as great longitudinal movement of the stem relative to the sleeve.

It must be evident that the sleeve carries the ring $m$ which has the recess, so the sleeve can be properly said to carry the recess. It must also be apparent that the recess can be made accessible from the outside of the sleeve. In this case it is made accessible from the outside of the sleeve by making the portion that carries the recess, namely, the ring $m$, a removable portion of the sleeve and making the closure a removable closure. This allows the cap $x$ to be taken off and the ring and the enlarged stem portion removed from the sleeve, exposing the slots and making it accessible.

What I claim is:

1. A stud driver, having in combination, a stem provided with an opening in its side, a sleeve having a threaded outer end and adapted to fit onto and be secured to the stem, a ring fastened to the sleeve provided with an opening, one of said openings being an oblique slot, and a ball in the space formed by the overlapping of said openings.

2. A stud driver, having in combination, a stem provided with a portion having an opening, a sleeve adapted to be secured over the stem and provided with a removable portion having an opening, one of the openings being an oblique slot, and a lost motion and cam connection between the sleeve and the stem in the form of an all-times loose member engaging in the space formed by the two openings.

3. A stud driver, comprising a stem having an enlarged portion provided with an opening, a sleeve having its outer end screw-threaded and having a ring seat, a cap for the sleeve, a ring provided with an opening and keyed to the sleeve, one of the openings being an oblique slot, and a ball engaging in the space formed by the overlapping of the two openings, for the purpose specified.

4. A stud driver, having in combination, a stem provided with a slot, a sleeve internally screw-threaded at its outer end fitting over the stem, a cap fitting over the stem and screwing onto the inner end of the sleeve, a ring keyed to the sleeve provided with an oblique slot, and a member engaging loosely in the space formed by the two slots when in overlapped relation.

5. A stud driver, having in combination, a sleeve threaded at its outer end to fit over a stud, a closure for the inner end of the sleeve, a stem provided with an enlarged portion having an oblique slot, the said sleeve carrying a recess for a rolling member which can be made accessible from the outside of the sleeve, and a rolling member for engaging in the space formed by the lapping of the recess supported by the sleeve and the oblique slot of the stem.

6. A stud driver, having in combination, a stem having an opening in its side and adapted to engage the end of the stud, a sleeve supporting a recess or opening, the two openings adapted to overlap and one of them being in the form of a slot obliquely disposed to the axis of the sleeve, and a rolling member assembled into the space formed by the two overlapping openings and acting as a drive between the stem and the sleeve and operating in connection with the oblique opening to release the stem from the end of the stud in turning the sleeve off from the stud.

In witness whereof I have hereunto set my hand on the 22nd day of January, 1919.

FRANK M. FUNK.

Copies of this patent may be obtained for five cents each, by addressing the "Commissioner of Patents, Washington, D. C."